(No Model.)
L. THANNER.
BICYCLE SLED.
No. 527,903. Patented Oct. 23, 1894.
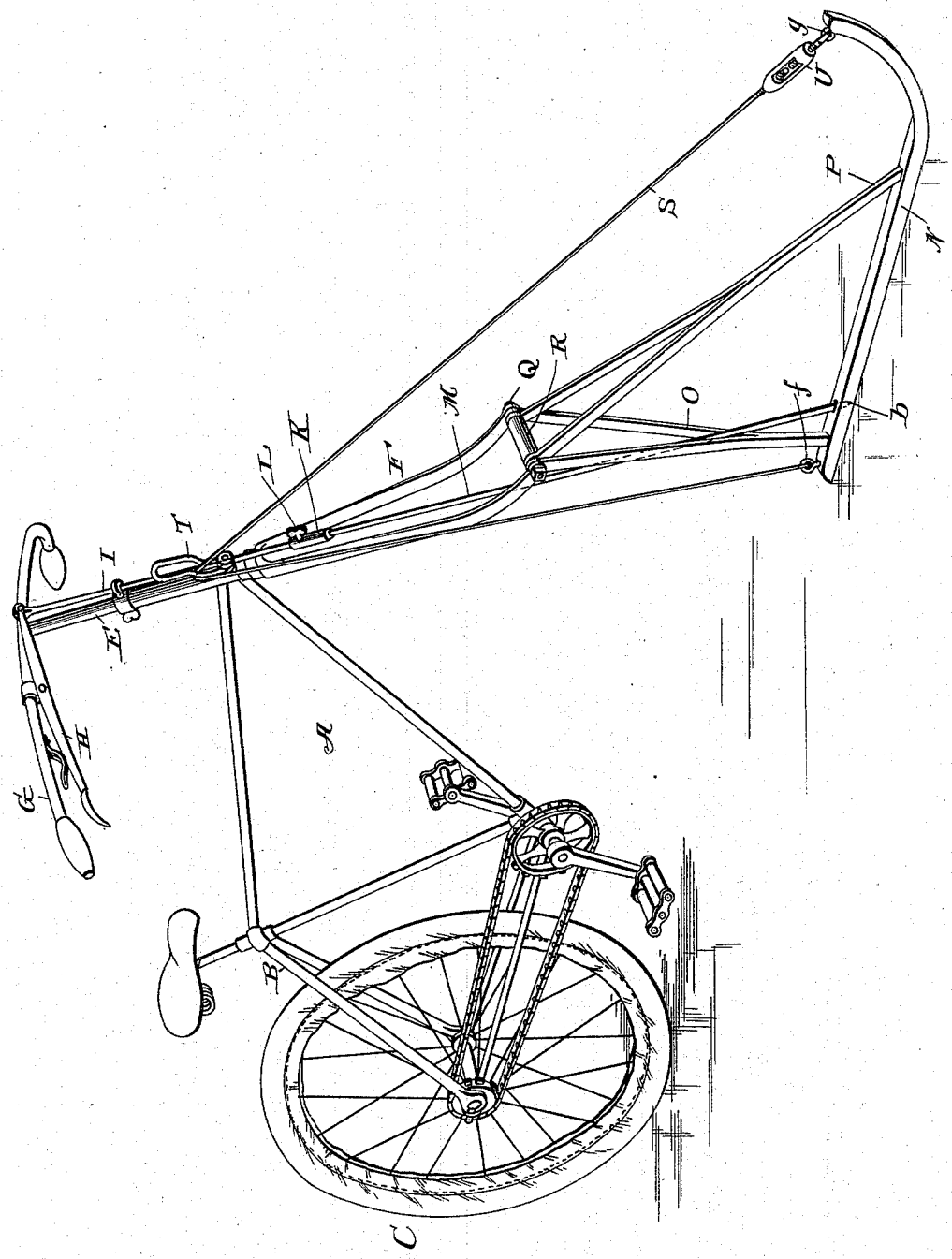
Witnesses
Inventor
L. Thanner
By Attorney James J. Sheehy

UNITED STATES PATENT OFFICE.

LEONHARD THANNER, OF BOERWANG, GERMANY, ASSIGNOR TO EMIL CHRISTIANSEN, OF LEAVENWORTH, KANSAS.

BICYCLE-SLED.

SPECIFICATION forming part of Letters Patent No. 527,903, dated October 23, 1894.

Application filed July 6, 1894. Serial No. 516,776. (No model.)

*To all whom it may concern:*

Be it known that I, LEONHARD THANNER, a citizen of the German Empire, residing at Boerwang, in the Kingdom of Bavaria, German Empire, have invented a Bicycle-Sled, of which the following is a full, clear, and exact description, such as will enable others skilled in the art to which it appertains to make and use the same.

This invention has relation to an improvement in snow and ice bicycles, and it has for its prime object to provide a sled attachment which may be used interchangeably with the front wheel of any safety bicycle, without necessitating any alteration or change in the construction.

Other objects and advantages will appear from the following description and claims when taken in connection with the annexed drawing, in which the figure represents a safety with the front wheel removed and my improvements applied.

Referring by letter to said drawing, A— indicates the frame of a bicycle; the one shown being of the character known as the diamond frame, but it is obvious that a frame of any other character might be employed, and this frame together with the rear fork B, the rear wheel C, pedals and seat, may be of any ordinary or approved construction, and such parts as well as the driving mechanism form no part of my invention, they being shown simply for the purpose of illustrating one character of bicycle upon which my improvements can be applied. It is desirable for the purpose of preventing the wheel from slipping on smooth ice to encircle the rear wheel C, with a strip of canvas or other coarse fabric.

The guide bar E, which may be of any suitable construction, carries at its lower end the front fork F, which is designed to receive between its branches, the front wheel (not shown) and which may also be of a construction usually employed.

The handle bar G, carrying the usual brake lever H, has attached to the latter, the brake rod I, and this brake rod carries at its lower end, a socket K, having a set screw L, to receive the brake rod M. This lower brake rod M, which takes into the socket K, and is secured therein by the set screw, may when the front wheel is used, carry a brake shoe to apply the brake to the wheel, and when the runner is used, this brake rod is pointed as shown at *b*, so that it will go through the runner and may be forced into ice or snow by simply manipulating the brake lever H, in the ordinary manner.

N, indicates the runner. This runner which maybe composed of metal or wood faced with metal or otherwise suitably constructed is of a proportional size as shown, and is designed to be attached to the front fork when the front wheel has been removed. This runner is provided on its rear upper side at a suitable distance from its end with a forked upright O. This upright is here illustrated as connected to the runner, and the upper ends of the branches are provided with aligned holes to register with those on the lower ends of the front fork of a bicycle.

P, indicates a connection which is disposed rearwardly oblique. This connection is secured to the runner at a suitable distance from its forward end in a manner similar to the forked upright, and the ends of its forked branches are also provided with holes to register with holes of the forked upright and the front fork of the bicycle frame; the whole being designed to receive a transverse bolt Q, secured in place by nuts or the like, and a sleeve R, is interposed between the branches and upon the bolt as shown.

S, indicates an adjustable wire. This wire is secured at one end to a screw eye *f*, or the like on the rear end of the sled or runner, and passes from thence upwardly and around or over the lamp bracket T, on the head of the bicycle frame or other suitable bearing, and down to the forward upwardly-curved end of the runner where it is attached, with a turn buckle U, interposed between the connection. The nut of the turn buckle is secured at one end to the runner by means of a screw eye *g*, or the like, and the contiguous end of the tie rod is threaded as shown, and is engaged by said turn buckle which is screw tapped to receive it.

From the construction described it will be seen that I do not materially alter the construction of the bicycle proper in any manner whatever; it being simply necessary in converting the bicycle from a land or road device, for snow and ice, to remove the front wheel from the fork F, and slip off the brake shoe. The upright of the runner, and the connection P, are then brought with their holes into alignment, the sleeve R, placed in position and the bolt Q, inserted and secured. The forked brake rod M, is then secured to the socket K, by means of the set screw after which the tie rod should be passed over the lamp bracket or other suitable bearing on the head of the frame, and tightened or adjustably secured by means of the turn buckle.

It will thus be seen that any ordinary bicycle can be readily converted to travel on snow or ice and that the devices are very cheap, may be quickly and easily applied and removed, and the connection and disconnection may be made by the user.

Having described my invention, what I claim is—

1. The combination with a bicycle frame, and the front fork thereof; of the runner, the forked upright, and the forked brace connected with the front and rear portion of the runner, as shown, and having holes at their upper ends, a sleeve and bolt for connecting the runner to the front fork, and the adjustable tie rod connecting the front and rear ends of the runner with the bicycle frame, substantially as specified.

2. The improved snow and ice attachment for bicycles, consisting of the runner, the forked upright and the forked brace secured to the runner at one end, and having holes in their opposite forked ends, the adjustable tie rod secured at opposite ends to the opposite ends of the runner, and the brake rod, the whole adapted to be applied to a bicycle frame and operate, substantially as specified.

In testimony whereof I have signed this specification in the presence of two subscribing witnesses.

LEONHARD THANNER.

Witnesses:
EUGEN GUGEL,
ALOIS EGLINGER.